(12) United States Patent
Farquhar et al.

(10) Patent No.: US 7,159,934 B2
(45) Date of Patent: Jan. 9, 2007

(54) VEHICLE SEAT AND HEAD RESTRAINT ASSEMBLY

(75) Inventors: Mark Farquhar, Ortonville, MI (US);
Kar K. Low, Southfield, MI (US);
Kenneth McQueen, Leonard, MI (US);
Mark S. Sebby, Brighton, MI (US);
Nagarjun Yetukuri, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/957,442

(22) Filed: Oct. 1, 2004

(65) Prior Publication Data

US 2006/0071514 A1 Apr. 6, 2006

(51) Int. Cl.
*B60N 2/00* (2006.01)
(52) U.S. Cl. .................................. 297/61
(58) Field of Classification Search ............ 297/61, 297/391, 408, 354.12
See application file for complete search history.

(56) References Cited

U.S. PATENT DOCUMENTS

| 3,929,374 A | * | 12/1975 | Hogan et al. ............ 297/61 |
| 5,695,251 A | | 12/1997 | Scolari |
| 5,748,473 A | | 5/1998 | Breed et al. |
| 5,975,637 A | | 11/1999 | Geuss et al. |
| 6,179,379 B1 | | 1/2001 | Andersson |
| 6,213,549 B1 | | 4/2001 | Wieclawski |
| 6,270,161 B1 | | 8/2001 | De Filippo |
| 6,273,511 B1 | | 8/2001 | Wiclawski |
| 6,354,659 B1 | | 3/2002 | Andersson et al. |
| 6,416,125 B1 | | 7/2002 | Shah et al. |
| 6,478,373 B1 | | 11/2002 | Hake et al. |
| 6,485,096 B1 | * | 11/2002 | Azar et al. ............... 297/61 |
| 6,604,788 B1 | | 8/2003 | Humer |
| 6,631,949 B1 | | 10/2003 | Humer et al. |
| 6,631,955 B1 | | 10/2003 | Humer et al. |
| 6,655,733 B1 | | 12/2003 | Humer et al. |
| 6,820,929 B1 | * | 11/2004 | Edrich et al. ............. 297/61 |
| 2004/0113480 A1 | | 6/2004 | Reed et al. |

FOREIGN PATENT DOCUMENTS

| DE | 197 50 375 A1 | 5/1998 |
| DE | 199 57 194 A1 | 5/2001 |
| EP | 0842814 | 3/1999 |
| FR | 2791306 | * 9/2000 |
| GB | 2329113 A | 3/1999 |
| WO | WO 02/20306 | 3/2002 |

* cited by examiner

*Primary Examiner*—Milton Nelson, Jr.
(74) *Attorney, Agent, or Firm*—Brooks Kushman P.C.

(57) ABSTRACT

A vehicle seat assembly includes a seat bottom and a seat back connected to the seat bottom. A reclining mechanism is configured to adjustably position the seat back. A head restraint assembly includes a head restraint and one or more supports receiving the head restraint extending through one or more slots in an upper frame member of the seat back frame. A head restraint adjustment mechanism cooperates with the seat back to position the head restraint adjacent an occupant's head. The head restraint adjustment mechanism includes a guide rotatably mounted to the seat back frame receiving the one or more head restraint supports, a cam rotatably mounted to the seat back frame and a linkage having a first end connected to the guide and a second end adjustably connected to the cam.

19 Claims, 4 Drawing Sheets

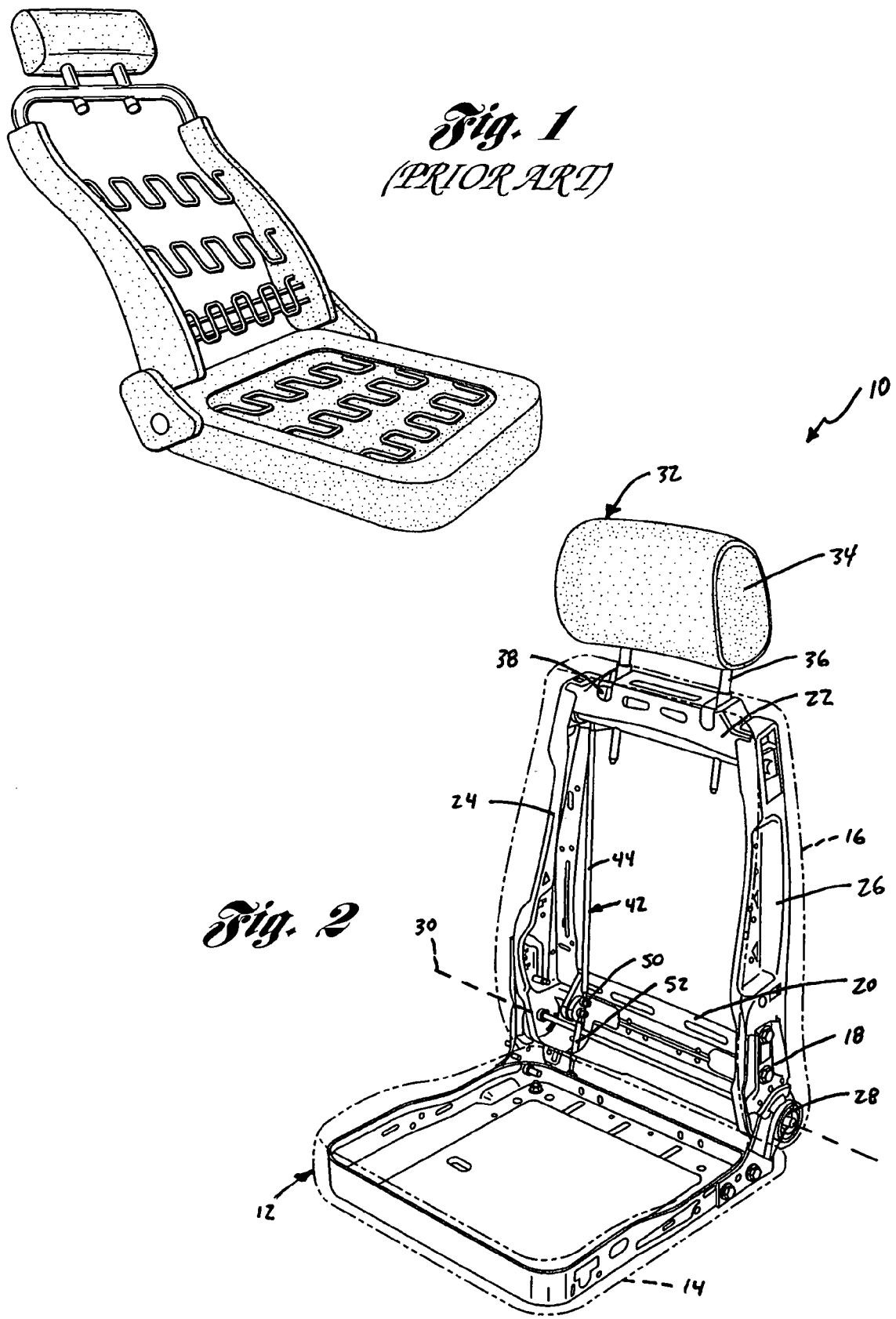

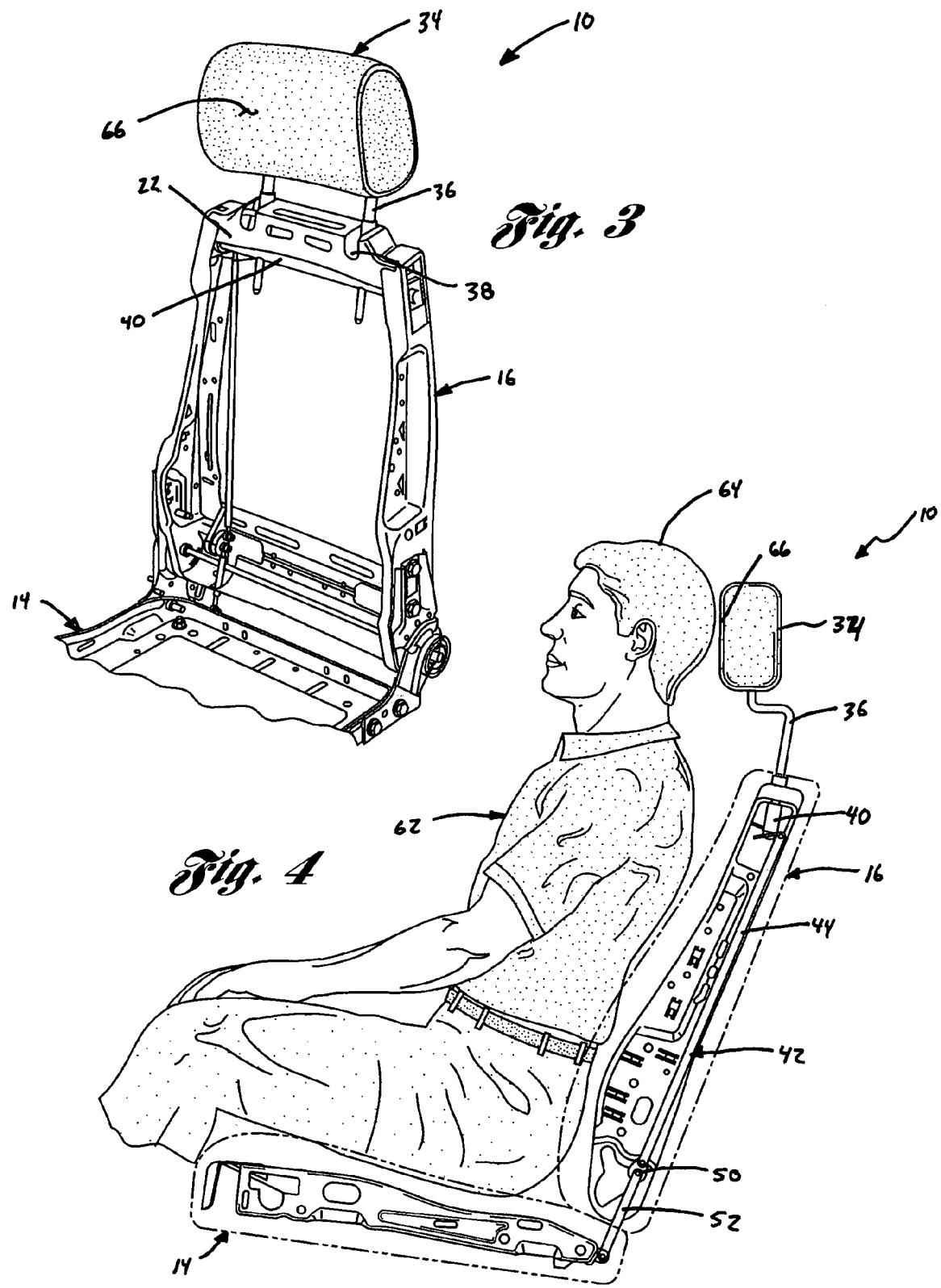

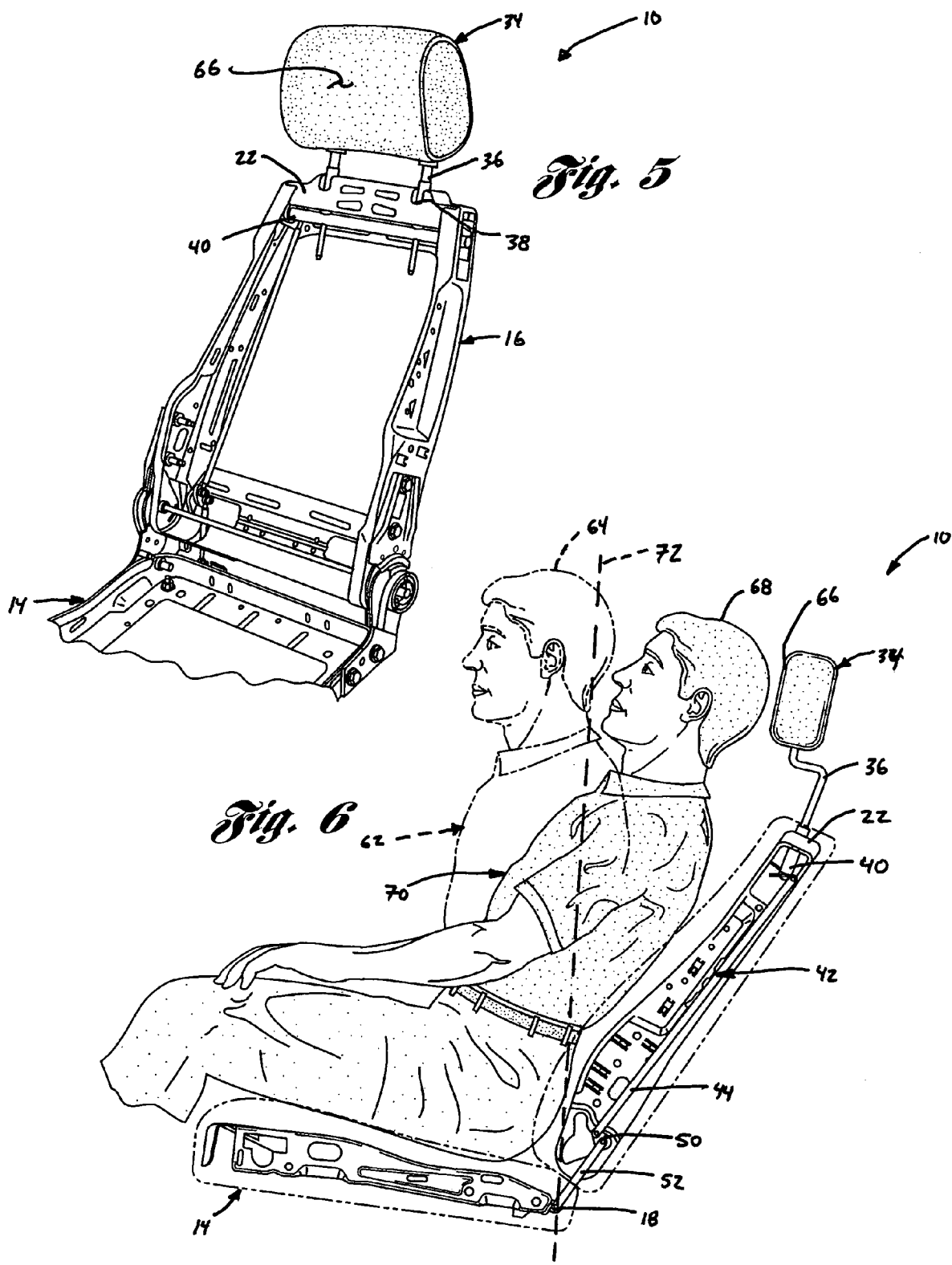

VEHICLE SEAT AND HEAD RESTRAINT ASSEMBLY

BACKGROUND OF THE INVENTION

1. Field of the Invention

The present invention generally relates to improvements in vehicle seat assemblies, and more particularly to a vehicle seat having an adjustable head restraint assembly.

2. Background Art

Generally, vehicle seats are formed as an assembly of elements including internal structural support mechanisms attached to a bottom and back frame member so as to extend across the seating area, a padding layer positioned over the support mechanism and the frame, and a finish seat covering sewn to provide the final protective and aesthetic appearance of the seat. An example of a conventional seat frame having metal support springs extending across the back fame is shown in FIG. 1.

Conventional seat assemblies include a headrest positioned adjacent a top portion of the seat back. The headrest is typically vertically adjustable relative to the seat back to provide head support for the seat occupant while the vehicle is in motion. One limitation of many seat assemblies is that occupants are susceptible to whiplash-type injuries from rear impact collisions because the headrest does not remain in proximity to the seat occupant's head, especially when the seat is pivoted rearward.

Recent developments in vehicle safety technology have incorporated a head restraint adjustment mechanism into vehicle seat assemblies to position the head restraint adjacent a passenger if a vehicle impact occurs. Vehicle seats having moveable head restraints or headrest arrangements are known in the vehicle seating art, such as the headrest arrangement disclosed in U.S. Pat. No. 6,604,788.

While such a seat assembly has proven satisfactory for many vehicles, a need exists to develop a vehicle seat having an adjustable head restraint assembly which positions the head restraint adjacent the occupant's head in a variety of seat back positions. It is also desirable to provide an adjustable head restraint assembly which cooperates with the seat back recliner mechanism to position the head restraint as the seat back is reclined.

SUMMARY OF THE INVENTION

A vehicle seat assembly for supporting an occupant includes a seat bottom and a seat back connected to the seat bottom having a frame including an upper frame member, a lower frame member and a pair of opposing substantially vertical side frame members extending between the upper and lower frame members. A head restraint assembly is adjustably connected to the seat back.

The head restraint assembly includes a head restraint and one or more supports receiving the head restraint extending through one or more slots in the upper frame member of the seat back frame. A head restraint adjustment mechanism cooperates with the seat back to position the head restraint adjacent an occupant's head. The head restraint adjustment mechanism includes a guide rotatably mounted to the seat back frame receiving the one or more head restraint supports and a cam or pivot member or cam rotatably mounted to a receiving plate extending from the seat back frame.

A linkage cooperates with the guide and cam to adjust the position of the head restraint between at least a first and a second position to maintain a constant backset between the occupant's head and the head restraint. Linkage includes a cam rotatably mounted to the seat back frame, an upper linkage and a lower linkage. Upper linkage includes a first end connected to the guide and a second end adjustably connected to the cam. The lower linkage includes a first end connected to the seat bottom and a second end adjustably connected to the cam.

A reclining mechanism is configured for adjustable positioning of the seat back. The cam cooperates with the reclining mechanism to transfer the movement of the seat back to the head restraint through the head restraint adjustment mechanism. The head restraint adjustment mechanism adjusts the head restraint position relative to the occupant's head as the seat back is rotated relative to a reference plane.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 1 is a perspective view of a conventional seat frame having a seat back support and head restraint assembly;

FIG. 2 is a perspective view of a vehicle seat assembly in incorporating a head restraint adjustment mechanism in accordance with the present invention;

FIG. 3 is a perspective view of the head restraint adjustment mechanism in the seat back of the vehicle seat assembly positioned in the passive position;

FIG. 4 is a side plan view of the vehicle seat assembly illustrating the head restraint adjustment mechanism and seat occupant in the passive position;

FIG. 5 is a perspective view of the head restraint adjustment mechanism in the seat back of the vehicle seat assembly positioned in the active position;

FIG. 6 is a side plan view of the vehicle seat assembly and occupant illustrating the head restraint adjustment mechanism in the active position;

DETAILED DESCRIPTION OF THE PREFERRED EMBODIMENT(S)

Figure 7:
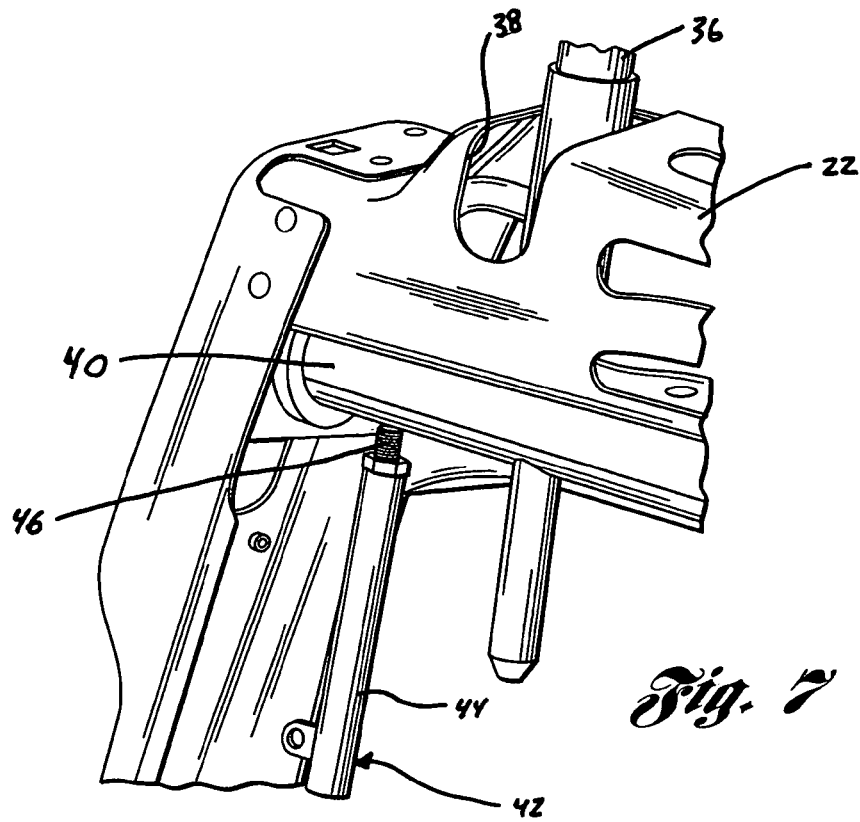
FIG. 7 is a perspective view of an upper portion of the vehicle seat assembly incorporating the head restraint adjustment mechanism.

Certain terminology presented below is used for convenience in reference only and is not intended to be limiting. More specifically, directional language such as "left", "right", "above", "below", "upper", "lower" and words of similar import designate directions shown in the drawings. Such directional terminology is used for clarity and is not intended to strictly limit the orientation of any aspect of the invention to a particular plane or direction.

Referring now to the Figures, a seat assembly configured for use in a vehicle, such as an automobile, boat or aircraft is shown and disclosed. As shown in FIG. 2, a vehicle seat assembly 10 is illustrated having a frame 12 including a seat bottom 14 and a seat back 16. Seat back 16 may be adjustably connected to the seat bottom by a reclining mechanism 18. Seat bottom 14 may be mounted directly to the vehicle floor or coupled to seat adjuster mechanisms or rails extending longitudinally to the vehicle floor enabling lateral and/or vertical movement of the seat bottom with respect to the vehicle floor. Seat bottom 14 is conventional in design and can be constructed in accordance with any known manner, including a structural frame covered by a foam pad layer and outer finish cover material, or alternatively, with an elastomeric sock or sling.

Seat frame 12, including seat bottom 14 and seat back 16, is preferably formed from a lightweight material such as polycarbonate fiber or aluminum. However, it is understood that a variety of materials suitable for structural support of an occupant may also be used to create the seat frame. Seat back 16 includes a lower frame member 20, an upper frame member 22 and substantially vertical opposing side frame members 24, 26. Lower and upper frame members 20, 22 extend laterally to connect the opposing side frame members 24, 26. Frame members 20, 22, 24, 26 may be integrally formed or may be separate components that are joined in any suitable manner, such a by fasteners, adhesive or welding, to form seat back 16. Seat back 16 may have any suitable configuration.

Frame members 20, 22, 24, 26 cooperate with a seat back layer, such as an elastomeric sock or a structural frame covered by a pad layer and cover material, to support the occupant. Opposing side frame members 24, 26 are connected to seat bottom 12 by reclining mechanism 18. Reclining mechanism 18 extends laterally between the side frame members 24, 26 and cooperates with knob or handle 28, allowing an occupant to adjust the vertical orientation of the seat back 16 about a pivot axis 30. It is understood that a switch-activated electromechanical reclining mechanism may be coupled to the seat assembly.

Seat back 16 includes an adjustably connected head restraint or restraint assembly 32. Head restraint assembly 32 is moveably associated with the seat back 14. More specifically, the head restraint assembly 32 is moveable between a first position shown in FIGS. 3 and 4 and at least one second position shown in FIGS. 5 and 6. The head restraint assembly 32 includes a headrest or head restraint pad 34 and one or more linkages 36 extending to the head restraint through the upper frame member 22. In a preferred aspect of the present invention, head restraint supports 36 having any suitable configuration and allowing for vertical and angular rotation of the head restraint pad 34 mounted thereon. In the embodiment shown in the Figures, the head restraint support 36 has a generally U-shaped configuration. However, it is understood that a variety of support configurations may be used to accomplish the same functionality.

Referring to FIGS. 3, 5 and 7, the upper frame member 22 of seat back 16 includes one or more slots 38 adapted to receive the head restraint assembly 32. In the embodiment shown, head restraint supports 36 extend through the slots 38. The slots 38 may be configured to allow the head restraint pad 34 to move upward and/or forward to contact the head of an occupant. Slots 38 may also be configured to provide limit stops for the head restraint supports 36 as the supports 36 move through slots 38.

Guide 40 is adapted to receive the head restraint supports 36. Guide 40 may be configured to provide a pivot point for changing the trajectory of the head restraint pad 34 in the event of a vehicle impact event or the reclining of the seat back 16. In one aspect of the present invention, guide 40 includes one or more separate components rotatably mounted to the upper frame member 22 in any suitable manner, such as fasteners, or the like. In another aspect of the present invention, guide 40 is integrally formed with the upper frame member 22. In yet another aspect of the present invention, guide may be connected to and extend generally laterally between the opposing side frame members of the seat back.

Referring now to FIGS. 2 and 7, head restraint adjustment mechanism, generally referenced by numeral 42, of head restraint assembly 32 is described in greater detail. Head restraint adjustment mechanism includes at least one linkage having a first end extending through at least one slot in the seat back frame cooperating with the head restraint and a second end pivotally mounted to the seat back frame to allow positioning of the head restraint between the first and second positions adjacent the occupant's head.

In a preferred aspect of the present invention, head restraint adjustment mechanism 42 includes an upper linkage 44 having a first end 46 connected to guide 40 and a second end 48 adjustably connected to a pivot member or cam 50. Cam 50 translates movement of the seat back through the upper linkage 44 to head restraint support 36 to adjust the position of the head restraint pad 34 relative to the seat back. A description of this movement will be provided in greater detail below.

Figure 8:
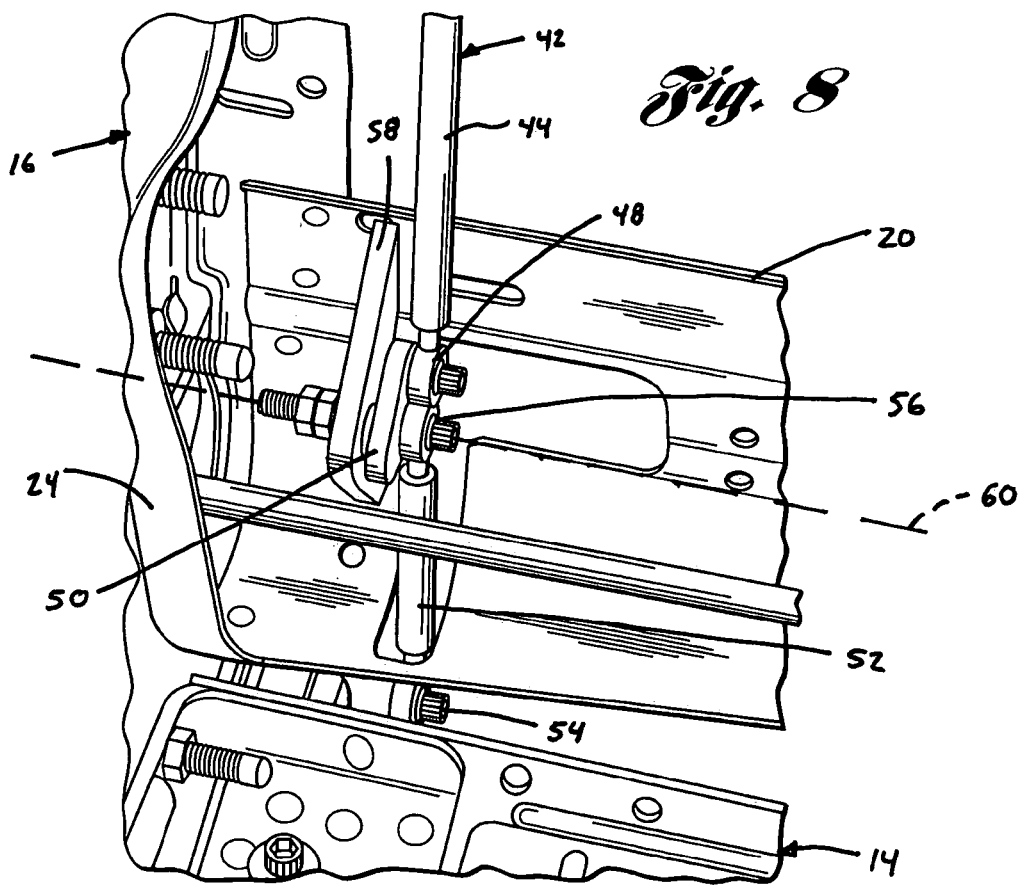
FIG. 8 is a perspective view of a lower portion of the seat back and rear portion of the seat bottom of the vehicle seat assembly receiving a portion of the head restraint adjustment mechanism.

Referring now to FIGS. 2 and 8, a lower linkage 52 includes a first end 54 anchored or connected to the seat bottom 14 or seat back 16 and a second end 56 adjustably connected to the cam 50. Cam 50 is rotatably mounted to a receiving plate 58 extending from the lower frame member 20 of the seat back 16. It is understood that the receiving plate 58 may extend from either side frame member 24, 26 or from an independent support member extending laterally between the side frame members 24, 26.

In one aspect of the present invention, a fastener 60 extends through apertures in the pivot member or cam 50 and receiving plate 58 to connect the lower linkage 52 to the cam 50, allowing cam 50 to rotate about axis 60. It is understood that the cam may be rotatably mounted to the receiving plate by a variety of methods, including, for example, a projection extending from the receiving plate through an aperture in the pivot member.

Head restraint adjustment mechanism 42 may have any suitable configuration. As illustrated in the Figures, head restraint adjustment mechanism 42 comprises a lower linkage 52 connected to the seat bottom 14 and an upper linkage 44 connected to guide 40 and cam 50. Cam 50 synchronizes the adjustment of the vehicle seat back 16 with adjustment of head restraint pad 34 so that the backset between the head restraint and the occupant's head is maintained within tolerance limits. Tolerance limits are typically defined by design choices. For example, most vehicle seats use a human torso angle range of 18 to 25° to develop the appropriate seating position. As a result, the backset between the occupant's head and the head restraint pad may range between 50 and 70 millimeters. However, it is understood that the present invention may be used with a wide range of seating configurations and accept backset tolerances exceeding the preferred range.

Cam 50 translates the reclining motion of the seat back, rotating about receiving plate 58, adjusting the upper linkage 44 and guide 40 attached thereto, thereby positioning the head restraint 34 between an initial position and at least one forward position. Head restraint adjustment mechanism 42 extends generally vertically through the seat back 16 adjacent a side frame member 24. However, it is understood that head restraint adjustment mechanism 42 may be positioned in a variety of locations in the seat back 16. Further, it is understood that head restraint adjustment mechanism may contain one or more linkages and cams to translate the reclining motion of the seat back to the head restraint.

Movement of the head restraint assembly during the reclining of the seat back 16 of vehicle seat assembly 10 or a vehicle impact event will now be described. As shown in FIGS. 3 and 4, seat assembly 10, including seat bottom 14, seat back 16 and head restraint assembly are disposed in a first or initial position to support an occupant 62. In the initial position, the distance between the back of the occupant's head 64 and the front surface 66 of the head restraint pad 34 is a defined backset, typically between 50 and 70 millimeters. Head restraint assembly, including head restraint 34 pad, head restraint supports 36, guide 40 and head restraint adjustment mechanism 42 are aligned to provide support for occupant 62. In the initial vehicle seat position illustrated in FIGS. 3 and 4, cam 50 positions upper linkage 44 and lower linkage 52 in a generally planar relationship, placing head restraint 34 pad adjacent the occupant's head 62.

Referring now to FIGS. 5 and 6, vehicle seat assembly 10 is shown in a second or reclined position. Occupant 62 operates reclining mechanism 18 to rotate the seat back about pivot axis 30. The initial body position of occupant 62 is shown in phantom in FIG. 6. As seat back 16 is reclined, the angular rotation of the seat back is transferred to the head restraint assembly through the cam 50 to maintain a constant backset between the head 68 of occupant 70 and the front surface 66 of the head restraint 34. Typically, when the seat back 16 is reclined, the backset between the back of the occupant's head 64 and the front surface 66 of head restraint 34 increases, possibly resulting in a higher severity of whiplash injury during a vehicle impact event. Maintaining a constant backset between the front surface 66 of head restraint 34 and the occupant's head 68 when the seat is reclined reduces the severity of potential whiplash injury to occupant 62, 70.

In one aspect of the present invention, head restraint adjustment mechanism 42 of head restraint assembly maintains a constant backset distance between the front surface 66 of head restraint pad 34 and the occupant's head 68 from about 20° to about 35° rearward relative to a reference plane, such as the vertical Y-axis 72. When the seat back is reclined between 0° and about 20° rearward, and beyond about 35° rearward of the Y-axis 72, the head restraint 34 moves in conjunction with the seat back 16 but does not maintain a constant backset between the occupant's head 68 and the head restraint pad 34.

When the seat back is reclined rearward from about 25° to about 35° relative to the Y-axis 72, the head restraint pad 34 is moved forward to maintain a desired backset with the occupant's head 68. When the seat back is reclined forward from about 25° to about 20°, the head restraint pad 34 is moved rearward to maintain the desired backset distance with the occupant's head 68. It is understood that the present invention is not limited to these ranges and may function with a diverse range of recline angles based on design choice and customer preference.

As shown in FIGS. 5 and 6, as recliner mechanism 18 rotates the backrest 16 rearward relative to seat bottom 14, cam 50 rotates on receiver plate. The rotation of cam 50 causes the second end of upper linkage 44 to rotate forward. Upper linkage 44 translates this rotation to guide 40 receiving head restraint supports 36. Guide 40 rotates in upper frame member 22, causing head restraint supports 36 to move through slots 38 in frame member 22, allowing head restraint pad 34 to move forward or rearward relative to seat back 16 to maintain a constant backset between the occupant's head 68 and head restraint pad 34. As the seat is returned to the first or initial position illustrated in FIG. 4, cam 50 rotates on receiving plate, causing upper linkage 44 to return the head restraint pad 34 to the initial position.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly for supporting an occupant, the assembly comprising:
   a seat bottom;
   a seat back connected to the seat bottom having a frame including an upper frame member; and
   a head restraint assembly adjustably connected to the seat back, the head restraint assembly including a head restraint and a head restraint adjustment mechanism cooperating with the seat back to position the head restraint adjacent an occupant's head, the head restraint adjustment mechanism including one or more head restraint supports receiving the head restraint, at least one linkage having a first end extending through one or more slots in the seat back frame cooperating with the head restraint and a second end pivotally mounted to the seat back frame to allow positioning of the head restraint between the first and second positions adjacent the occupant's head and a guide rotatably mounted to the seat back frame receiving the one or more head restraint supports,
   wherein the head restraint adjustment mechanism positions the head restraint adjacent the occupant's head as the seat back is adjusted between at least a first and a second position relative to a reference plane.

2. The vehicle seat assembly of claim 1 further comprising a reclining mechanism configured to adjustably position the seat back.

3. The vehicle seat assembly of claim 1 wherein the head restraint adjustment mechanism adjusts the head restraint position relative to the occupant's head to maintain a constant backset as the seat back is rotated between about 20° and about 35° from the reference plane.

4. The vehicle seat assembly of claim 2 wherein the reclining mechanism cooperates with the head restraint adjustment mechanism to adjustably position the head restraint adjacent the head of the seat occupant.

5. The vehicle seat assembly of claim 1 wherein the head restraint adjustment mechanism further comprises a cam rotatably mounted to the seat back frame and the at least one linkage includes an upper linkage having a first end connected to the guide and a second end adjustably connected to the cam, and a lower linkage having an anchored first end and a second end adjustably connected to the cam.

6. The vehicle seat assembly of claim 1 wherein the first end of the lower linkage is anchored to the seat bottom frame.

7. The vehicle seat assembly of claim 5 wherein the cam is rotatably mounted to a receiving plate extending from the seat back frame.

8. The vehicle seat assembly of claim 7 wherein the seat back frame further comprising a lower frame member supporting the receiving plate and a pair of opposing substantially vertical side frame members extending between the upper and lower frame members.

9. The vehicle seat assembly of claim 1 wherein the one or more slots in the seat back frame limit the travel of the at least one linkage of the head restraint adjustment mechanism receiving the head restraint.

10. A vehicle seat assembly comprising:
a seat bottom; a seat back connected to the seat bottom having a frame including an upper frame member;
a reclining mechanism configured to adjustably position the seat back;
a head restraint assembly adjustably connected to the seat back, the head restraint assembly including a head restraint and one or more head restraint supports receiving the head restraint extending through one or more slots in the upper frame member of the seat back frame; and
a head restraint adjustment mechanism cooperating with the seat back to position the head restraint adjacent an occupant's head, the head restraint adjustment mechanism including a guide rotatably mounted to the seat back frame receiving the one or more head restraint supports, a cam rotatably mounted to the seat back frame and a linkage having a first end connected to the guide and a second end adjustably connected to the cam, wherein the head restraint adjustment mechanism positions the head restraint adjacent the occupant's head as the seat back is adjusted between at least a first and a second position relative to a reference plane.

11. The assembly of claim 10 wherein the reclining mechanism cooperates with the head restraint adjustment mechanism to adjustably position the head restraint adjacent the head of the seat occupant.

12. The assembly of claim 10 wherein the head restraint adjustment mechanism adjusts the head restraint position relative to the occupant's head to maintain a constant backset as the seat back is rotated between about 20° and about 35° from the reference plane.

13. The assembly of claim 10 wherein the head restraint adjustment mechanism further comprises a lower linkage having an anchored first end and a second end adjustably connected to the cam.

14. The assembly of claim 10 wherein the first end of the lower linkage is anchored to the seat bottom.

15. The assembly of claim 10 wherein the cam is rotatably mounted to a receiving plate extending from the seat back frame.

16. The assembly of claim 15 wherein the seat back frame further comprising a lower frame member supporting the receiving plate and a pair of opposing substantially vertical side frame members extending between the upper and lower frame members.

17. A seat back and head restraint assembly configured for use with a vehicle seat having a seat bottom, the assembly comprising:
a seat back connectable to the seat bottom having a frame including an upper frame member;
a reclining mechanism configured to adjustably position the seat back;
a head restraint extending above the seat back frame including a pad portion;
one or more head restraint supports receiving the head restraint extending through one or more slots in the upper frame member;
a guide rotatably mounted to the seat back frame receiving the one or more head restraint supports;
a cam rotatably mounted to the seat back frame;
an upper linkage having a first end connected to the guide and a second end adjustably connected to the cam; and
a lower linkage having a first end connectable to the seat bottom and a second end adjustably connected to the cam,
wherein the head restraint is adjustably positionable between at least a first and a second position as the seat back is adjusted relative to a reference plane.

18. The assembly of claim 17 wherein the upper linkage and guide cooperate to adjust the position of the head restraint relative to an occupant's head to maintain a constant backset as the seat back is rotated between about 200 and about 35° from the reference plane.

19. The assembly of claim 17 wherein the seat back frame further comprising a lower frame member including a receiving plate for rotatably mounting the cam and a pair of opposing substantially vertical side frame members extending between the upper and lower frame members.

* * * * *

UNITED STATES PATENT AND TRADEMARK OFFICE
CERTIFICATE OF CORRECTION

PATENT NO. : 7,159,934 B2  Page 1 of 1
APPLICATION NO. : 10/957442
DATED : January 9, 2007
INVENTOR(S) : Mark Farquhar et al.

It is certified that error appears in the above-identified patent and that said Letters Patent is hereby corrected as shown below:

Column 6, Line 57, Claim 6:

Delete "1" and insert -- 5 --.

Column 6, Line 59, Claim 6:

Delete "frame".

Colum 8, Line 36, Claim 18:

Delete "200" and isnert therefor -- 20° --.

Signed and Sealed this

Tenth Day of April, 2007

JON W. DUDAS
*Director of the United States Patent and Trademark Office*